(No Model.)
G. L. JARRETT.
FLOUR BOLTING REEL.
No. 487,838. Patented Dec. 13, 1892.
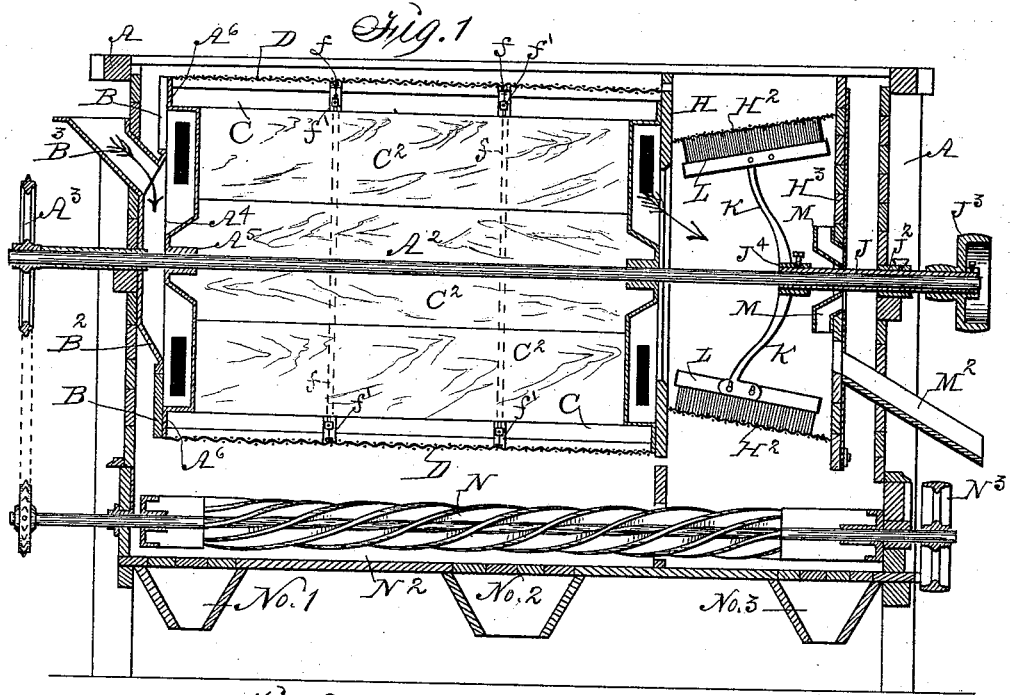
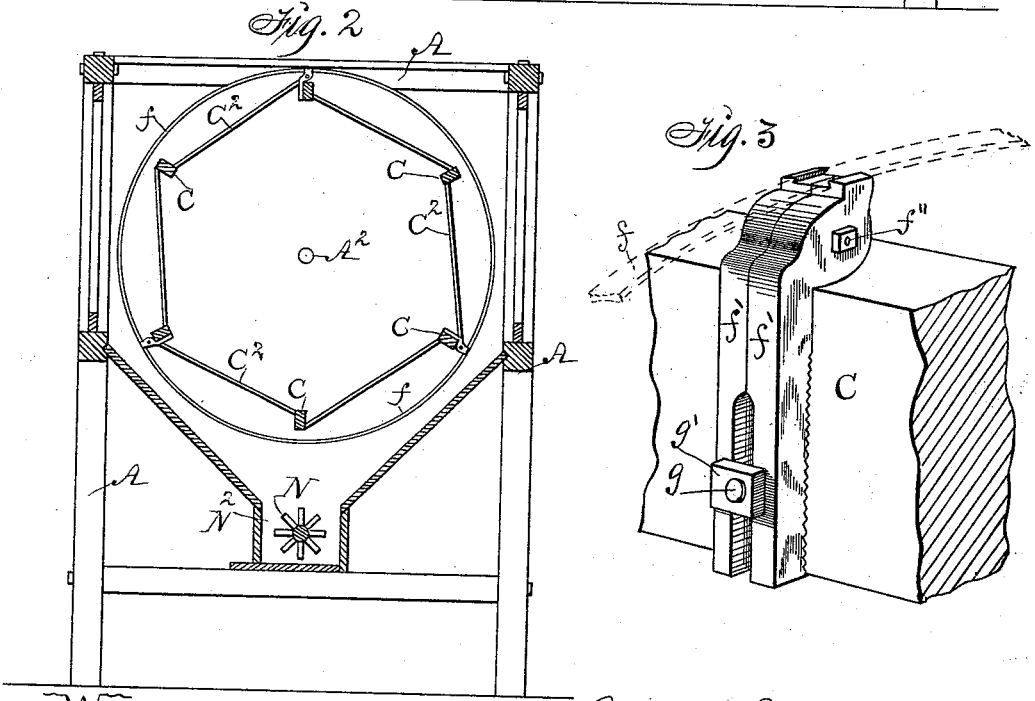
Witnesses:
W. P. Smith.
R. H. Orwig.
Inventor: George L. Jarrett,
By Thomas G. Orwig, Attorney.

UNITED STATES PATENT OFFICE.

GEORGE L. JARRETT, OF DES MOINES, IOWA.

FLOUR-BOLTING REEL.

SPECIFICATION forming part of Letters Patent No. 487,838, dated December 13, 1892.

Application filed September 29, 1891. Serial No. 407,206. (No model.)

*To all whom it may concern:*

Be it known that I, GEORGE L. JARRETT, a citizen of the United States of America, residing at Des Moines, in the county of Polk and State of Iowa, have invented an Improved Flour-Bolting Reel, of which the following is a specification.

Heretofore bolting-reels have been used to separate flour and bran or tailings and the latter-named product then passed through a bran-duster to produce a second grade of flour by separating the bran from the flour remaining therewith.

My object is to provide a machine adapted to do the work for which two machines have been used; and my invention consists in the construction and combination of a reel for receiving and separating the products of a mill as required to produce flour and bran, a rotating screen adapted to receive the tailings or bran as that product escapes from the reel, brushes for separating the flour in the bran from the bran, mechanism for operating the brushes, and means for discharging the bran from the screen, as hereinafter set forth, pointed out in the claims, and illustrated in the accompanying drawings, in which—

Figure 1 is a vertical and longitudinal sectional view of my machine, showing all the parts in position relative to each other as required for practical use. Fig. 2 is a transverse sectional view of the case and reel and a conveyer under the reel. Fig. 3 is an enlarged perspective view showing an adjustable clamp for fastening the hoops to the ribs of the reel.

A represents the frame and case adapted to support and inclose the reel, brushes, conveyer, and operative mechanisms.

$A^2$ is a rotating shaft in bearings at the ends of the case, and $A^3$ is a sprocket-wheel fixed to its end at the front of the machine as a means of imparting motion to the shaft and reel combined therewith.

$A^4$ is the cast-metal head end of the reel fixed to the shaft $A^2$ by means of the central hub $A^5$. The circumference of the head is angular in shape and adapted to admit the ends of wooden ribs to be fitted and fastened thereto. This angular rim $A^6$ of the head has openings through which the products of a mill can pass inward and outward, as indicated by arrows in Fig. 1.

B is a circular plate fixed to the front face of the flange that extends at right angles from the rim $A^6$ and has an open center.

$B^2$ is a feed device fixed to the case in concentric position with the shaft $A^2$ and fitted in the circular opening of the plate B in such a manner that the plate B revolving with the reel will be close to the flanged circumference of the device, so as to prevent flour from passing between the concentric parts B and $B^2$.

$B^3$ is a feed-spout formed on or fixed to the device $B^2$, as required, to convey meal inward to enter the reel. The rear end of the reel has a metal head corresponding with the head of the front end, but in a rearward position, as required, to convey bran outward and into the rotating screen to be subjected to the action of brushes, as required, to separate the second-grade flour and bran.

C are wooden ribs fixed to the angular peripheries of the metal heads $A^6$, and $C^2$ are boards fixed to the ribs, as shown in Fig. 2, to produce a hollow cylinder that has shoulders extending longitudinally the entire length of the cylinder to serve as elevators for carrying meal up and around the cylinder and within the bolting-cloth surrounding the cylinder.

D represents a bolting-cloth fixed to the circumference of the heads $A^4$ to produce a cylindrical form that incloses the closed hollow cylinder.

$f$ are metal hoops fixed to the ribs C by means of adjustable clamping devices to produce circular frames adapted to support the bolting-cloth, as required, to maintain a cylindrical shape around the closed cylinder. The clamping device is composed of two mating elbow-shaped jaws $f'$, that are placed in parallel position and adjustably connected by means of a bolt $f''$. Their lower ends are reduced in thickness to produce an elongated vacant space between them, through which a screw-bolt $g$, that extends through a rib C, is projected, so that they can be jointly clamped fast to the rib by means of a nut $g'$, placed on the end of the bolt $g$, as clearly shown in Fig. 2. The inside faces of the jaws are serrated and adapted to bite fast to the wood to prevent them from slipping. The metal hoops $f$ thus connected with the ribs C can be readily adjusted relative to the hollow cylinder by means of the adjustable clamps, and thereby firmly fixed to the ribs C, as required, to support and retain the bolting-cloth stretched and in concentric position with the axis of the reel.

H is a circular back fixed to the head at the rear end of the rotating reel and provided with a central opening, through which bran will pass from the central cone-shaped portion of the rear side of the head $A^4$ into a screen $H^2$, that has its small end fixed to the rear face of the partition. The large end of this cylindrical and tapering screen is fixed to a head $H^3$, that extends parallel with the rear end of the case.

J is a rotating sleeve on the shaft $A^2$ and in a bearing $J^2$, that is fixed to the case, and $J^3$ is a duplex belt-pulley on the outer end of the sleeve.

$J^4$ is a hub on the inner end of the sleeve, adjustably and detachably fastened thereto by means of a set-screw or in any suitable way.

K are arms extending radially from the hub $J^4$, and L are brushes adjustably and detachably fastened to the ends of the arms K to be rotated in contact with the cylindrical cone-shaped screen $H^2$, as required, to rub the tailings or bran that passes from the rotating reel into the rotating screen, as required, to rub the product to separate the flour from the bran. By adjusting the hub $J^4$ on the sleeve J or the brushes L on the arms K the brushes can be readily fitted to the inside surface of the screen, as required, to act thereon and, as required, to compensate for wear of the brushes.

M are open-ended pockets fixed to the head $H^3$ to receive the bran and waste product as it falls from the brushes and to direct it upon a chute $M^2$, that projects out through the rear end wall of the case.

N is a conveyer in the trough $N^2$ at the bottom of the case, and 1, 2, and 3 represent spouts through which three different grades of matter can be discharged.

The shaft $A^2$ and complete reel are operated by power applied thereto by means of the wheel $A^3$ on the end of the shaft $A^2$. The brushes L are operated by means of the wheel $J^3$, and the conveyer N by means of a pulley $J^3$ and a pulley $N^4$, as required, to actuate the different operative parts in concert and at such different rates of speed as may be desired.

Having described the construction and function of each element and sub-combination, I will now distinctly point out what I claim as new and desire to secure by Letters Patent—

1. A clamping device consisting of two elbow-shaped jaws adjustably connected by means of a bolt and nut and adjustably and detachably fastened to the rib of a reel by means of a bolt and nut, as shown and described, to fasten a rim or hoop to a reel, as and for the purposes stated.

2. A cylindrical screen having an opening at one end to admit bran and one or more openings at its other end to discharge bran, fixed to the end of a flour-bolting reel in concentric position with the axis of the reel, a sleeve on the projecting rear end of the reel-shaft, a belt-pulley on the end of the sleeve, a hub having radial arms fixed to the inner end of the sleeve, brushes on the ends of the said radial arms to engage the inside of the screen, and means for rotating the reel and the screen and the brushes simultaneously, for the purposes stated.

3. A flour-bolting reel and bran-separator comprising a frame and case adapted to inclose and support a reel and screen, a reel consisting of heads connected by a series of ribs, and boards fixed to the ribs to produce a hollow cylinder that has longitudinal shoulders outside adapted to elevate meal, hoops fixed to the ribs to support a bolting-cloth fixed to the heads, a rotating shaft extended through the heads of the reel and fixed thereto, a cylindrical screen fixed to the end of the reel and provided with communication therewith, a rotating sleeve on the end of the said shaft, a hub fixed to the sleeve, radial arms on the hub, and brushes on the free ends of the arms, open-ended pockets on the end of the screen to discharge matter outward, and means for rotating the reel and screen, and the sleeve carrying the brushes, arranged and combined to operate in the manner set forth, for the purposes stated.

4. A vertically-rotating flour-bolting reel provided with openings in the head at its rear end to discharge bran into a screen fixed to said rear head, a screen fixed to the said rear head to rotate therewith, a sleeve on the rear end of the reel-shaft and extended into the screen and provided with radial arms and brushes attached to the ends of said arms to engage the inside of the screen, means for rotating the sleeve upon the reel-shaft, and means for discharging bran rearward from the rear end of the screen, arranged and combined to operate in the manner set forth, for the purposes stated.

5. In combination with a flour-bolting reel, a cylindrical screen that is larger in diameter at one end than the other, having its front and small end fixed concentrically to the rear head of a flour-bolting reel and the reel-shaft extended through the screen, a sleeve on the end of said shaft extended forward into the screen and provided with radial arms and brushes on the ends of the arms, and means for rotating the sleeve to operate the brushes carried thereby upon the inside of the screen, and means for discharging bran rearward from the rear end of the screen, for the purposes stated.

GEORGE L. JARRETT.

Witnesses:
DORA M. THOMAS,
THOMAS G. ORWIG.